United States Patent
Narita et al.

(10) Patent No.: US 9,515,575 B2
(45) Date of Patent: Dec. 6, 2016

(54) POWER CONVERSION APPARATUS AND POWER CONVERSION METHOD

(71) Applicant: KABUSHIKI KAISHA YASKAWA DENKI, Kitakyushu-shi (JP)

(72) Inventors: Tetsumi Narita, Fukuoka (JP); Masato Higuchi, Fukuoka (JP); Yasuhiko Kawanami, Fukuoka (JP); Hidenori Hara, Fukuoka (JP); Takamitsu Katsuki, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/700,084

(22) Filed: Apr. 29, 2015

(65) Prior Publication Data
US 2015/0244287 A1 Aug. 27, 2015

Related U.S. Application Data

(63) Continuation of application No. PCT/JP2012/078079, filed on Oct. 30, 2012.

(51) Int. Cl.
*H02M 7/537* (2006.01)
*H02M 7/5387* (2007.01)
(Continued)

(52) U.S. Cl.
CPC ......... *H02M 7/537* (2013.01); *H02M 7/53871* (2013.01); *H02M 3/158* (2013.01);
(Continued)

(58) Field of Classification Search
CPC ............ H02M 7/42; H02M 7/44; H02M 7/53; H02M 7/537; H02M 7/5387; H02M 7/53871; H02M 7/53875
(Continued)

(56) References Cited

U.S. PATENT DOCUMENTS

2005/0088860 A1\* 4/2005 Okuma ................... H02J 9/062
363/35
2008/0247204 A1\* 10/2008 Renken ............... B60L 11/1803
363/124
(Continued)

FOREIGN PATENT DOCUMENTS

JP 2001-37246 2/2001
JP 4142879 B2 9/2003
(Continued)

OTHER PUBLICATIONS

Machine Translation of reference JP2009-126319A cited in Japanese office action corresponding to JP application No. 2014-544106. dated Oct. 4, 2016.*

(Continued)

*Primary Examiner* — Gary L Laxton
(74) *Attorney, Agent, or Firm* — Mori & Ward, LLP (57) ABSTRACT

A controller of a power conversion apparatus according to an embodiment causes a chopper and an inverter to generate an alternating-current (AC) voltage including first and second parts of an AC voltage waveform and causes the inverter to output the AC voltage. The chopper generates the first part having an absolute value higher than a voltage of a DC power supply, and the inverter generates the second part having an absolute value lower than the voltage of the DC power supply. The controller is configured to alternately turn on the first and second switching elements in a period during which the controller controls the chopper to generate the first part of the AC voltage waveform.

13 Claims, 4 Drawing Sheets

(51) Int. Cl.
  *H02M 3/158* (2006.01)
  *H02M 7/5395* (2006.01)
  *H02M 1/00* (2006.01)

(52) U.S. Cl.
  CPC .... *H02M 7/5395* (2013.01); *H02M 2001/007* (2013.01); *H02M 2001/0054* (2013.01); *Y02B 70/1491* (2013.01)

(58) Field of Classification Search
  USPC ...................................... 363/95, 97, 131, 98
  See application file for complete search history.

(56) References Cited

U.S. PATENT DOCUMENTS

| | | | | |
|---|---|---|---|---|
| 2012/0201064 | A1* | 8/2012 | Asakura | H02M 7/53871 363/98 |
| 2012/0256571 | A1* | 10/2012 | Ang | B60L 11/1803 318/400.3 |
| 2014/0321182 | A1* | 10/2014 | Takamatsu | B60L 7/14 363/132 |

FOREIGN PATENT DOCUMENTS

| | | |
|---|---|---|
| JP | 2005-304172 | 10/2005 |
| JP | 2009-126319 | 6/2009 |

OTHER PUBLICATIONS

International Search Report for corresponding International Application No. PCT/JP2012/078079, Jan. 29, 2013.
Written Opinion for corresponding International Application No. PCT/JP2012/078079, Jan. 29, 2013.
Chinese Office Action for corresponding CN Application No. 201280076745.5, Sep. 7, 2016.
Japanese Office Action for corresponding JP Application No. 2014-544106, Oct. 4, 2016.

* cited by examiner

POWER CONVERSION APPARATUS AND POWER CONVERSION METHOD

CROSS-REFERENCE TO RELATED APPLICATIONS

This application is a continuation of International Application No. PCT/JP2012/078079, filed on Oct. 30, 2012, the entire contents of which are incorporated herein by reference.

FIELD

The embodiment of the disclosure relates to a power conversion apparatus and a power conversion method.

BACKGROUND

A conventional power conversion apparatus has been known that is made by combining a chopper and an inverter, as an apparatus that generates and outputs an alternating-current (AC) voltage higher than a supplied direct-current (DC) voltage.

For example, Japanese Patent No. 4142879 discloses a power converter in which a controller controls an inverter to pulse-width-modulation (PWM) control and convert a DC voltage boosted by a chopper into an AC voltage and to output the AC voltage to an AC motor.

However, the conventional power conversion apparatus has a problem in power conversion efficiency because a DC voltage boosted by a chopper is PWM controlled and converted into an AC voltage by an inverter.

SUMMARY

A power conversion apparatus according to an aspect of an embodiment includes a chopper, an inverter, a second switching element, and a controller. The chopper includes a first switching element, an inductor, a diode, and a capacitor, and is configured to store power supplied from a direct-current (DC) power supply in the capacitor sequentially through the inductor and the diode by turning on and off the first switching element. The inverter is connected to an output of the chopper. The second switching element is connected to the diode in reverse parallel. The controller is configured to control the chopper and the inverter to generate an alternating-current (AC) voltage including first and second parts of an AC voltage waveform, and causes the inverter to output the AC voltage, in which the chopper generates the first part having an absolute value higher than a voltage of the DC power supply and the inverter generates the second part having an absolute value lower than the voltage of the DC power supply. The controller is configured to alternately turn on the first switching element and the second switching element in a period during which the controller controls the chopper to generate the first part of the AC voltage waveform.

BRIEF DESCRIPTION OF DRAWINGS

A more complete appreciation of the embodiment and many of the attendant advantages thereof will be readily obtained as the same becomes better understood by reference to the following detailed description when considered in connection with the accompanying drawings, wherein.

DESCRIPTION OF EMBODIMENTS

An embodiment of a power conversion apparatus and a power conversion method disclosed in the subject application is described in detail below with reference to the accompanying drawings. It should be noted that the embodiment below is not intended to limit this invention.

Figure 1:
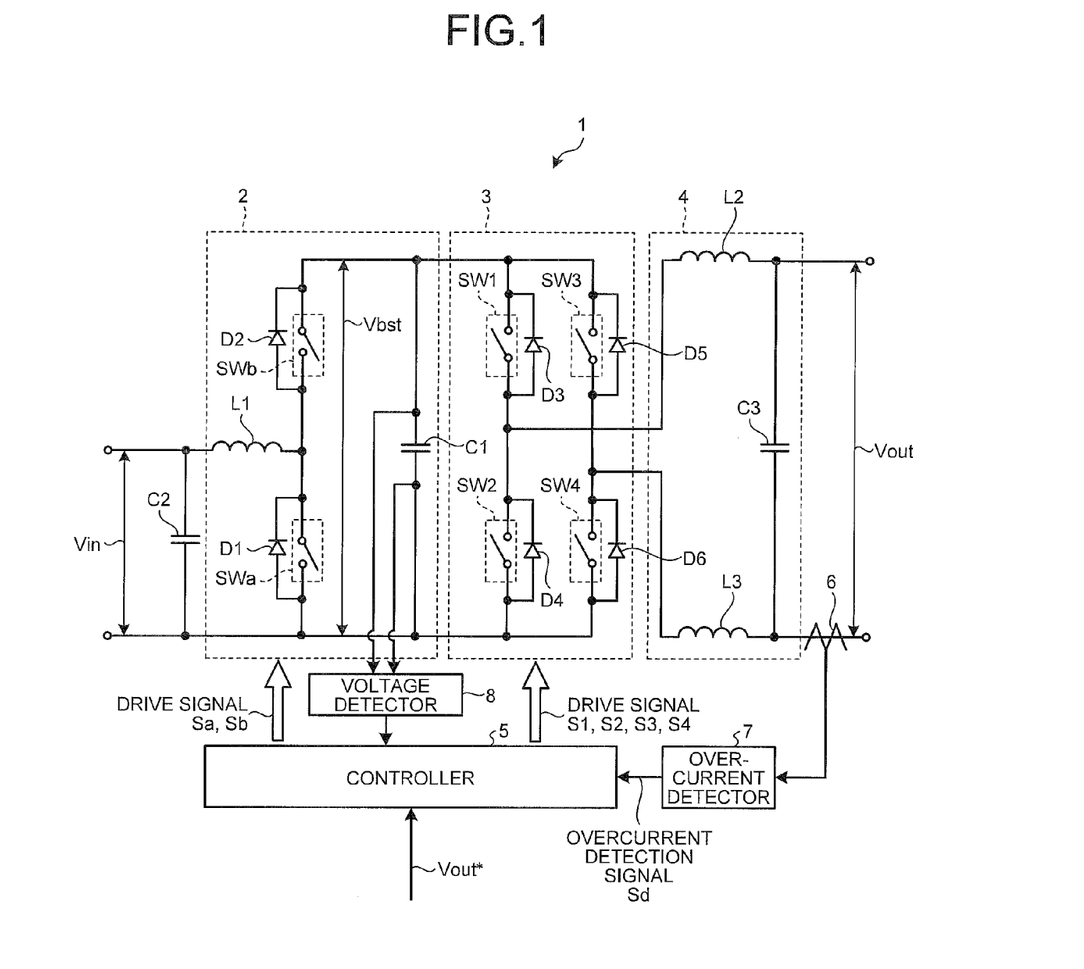
FIG. 1 is a view illustrating the configuration of a power conversion apparatus in accordance with an embodiment.

FIG. 1 is a view illustrating the configuration of a power conversion apparatus 1 in accordance with the embodiment. The power conversion apparatus 1 includes a chopper 2, an inverter 3, and a controller 5 as illustrated in FIG. 1.

The controller 5 controls the chopper 2 to boost a voltage of a direct-current (DC) power supply (hereinafter referred to as a "power supply voltage Vin") and generate a first part of an alternating-current (AC) waveform having an absolute value higher than a voltage of the DC power supply voltage Vin. The controller 5 also controls the inverter 3 to generate a second part of the AC voltage waveform having an absolute value lower than a voltage of the DC power supply voltage Vin input through the chopper 2. The controller 5 converts the power supply voltage Vin into an alternating-current (AC) output voltage Vout through the above-described control, and causes the inverter 3 to output the AC output voltage Vout.

The controller 5 inputs the power supply voltage Vin from the chopper 2 to the inverter 3 as it is in a period during which the inverter 3 generates the second part of the AC voltage waveform. This processing reduces switching loss in the inverter 3 as compared with the case in which the inverter 3 converts a DC voltage boosted by the chopper 2 into an AC voltage. Furthermore, switching loss in the inverter 3 is reduced because no switching is controlled in the inverter 3 during the chopper control.

No switching is controlled in the chopper 2 in a period during which the inverter 3 generates the second part of the AC voltage waveform. Therefore, the number of times of the switching of the chopper 2 can be reduced as compared with the case in which the switching of the chopper 2 is always performed to output a constant DC voltage to the inverter 3 and the switching of the inverter 3 causes the whole of the AC voltage waveform to be generated. Accordingly, switching loss in the chopper 2 is also reduced.

The power conversion apparatus 1 may be in a low-load state or no-load state in a period during which the chopper 2 generates the first part of the AC voltage waveform. In this case, for example, if the chopper 2 simply boosts the power supply voltage Vin and generates the AC voltage waveform, the boosted power may remain unconsumed by a load, thereby reducing the generation accuracy of the AC voltage waveform.

The power conversion apparatus 1 is configured to prevent the generation accuracy of an AC waveform from deteriorating even when the apparatus is in a low-load state or no-load state. The power conversion apparatus 1 is described in detail below.

The chopper 2 includes an inductor L1 connected to a DC power supply in series and a switching element SWa (which corresponds to an example of a first switching element) as illustrated in FIG. 1. A protective diode D1 is connected to the switching element SWa in reverse parallel.

The chopper 2 also includes a diode D2 having an anode connected between the inductor L1 and one end of the switching element SWa, a switching element SWb (which corresponds to an example of a second switching element) connected to the diode D2 in reverse parallel, and a capacitor C1 connected between a cathode of the diode D2 and the other end of the switching element SWa.

The configuration of the chopper 2 is not limited to the configuration illustrated in FIG. 1. As long as the configuration includes the diode D2 having an anode connected to the inductor L1 and a cathode connected to the capacitor C1, and the switching element SWb connected to the diode D2 in reverse parallel, the other components in the configuration are optional.

The inverter 3 is connected to the output of the chopper 2. The inverter 3 includes four full-bridge connected switching elements SW1, SW2, SW3, and SW4, and four feedback diodes D3, D4, D5, and D6 respectively connected to the switching elements SW1, SW2, SW3, and SW4 in reverse parallel in order.

The inverter 3 has the output connected to a filter 4, and converts a voltage output from the chopper 2 (hereinafter referred to as a "chopper voltage Vbst") into an AC output voltage Vout so as to output the AC output voltage Vout to a load (not illustrated) connected to the output side of the filter 4. The filter 4 includes two inductors L2 and L3, and a capacitor C3, and smoothes a pulse voltage output from the inverter 3 as the AC output voltage Vout.

The controller 5 controlling the chopper 2 and the inverter 3 turns on and off the switching element SWa of the chopper 2 so as to store the power supplied from the DC power supply in the capacitor C1 through the inductor L1 and the diode D2 in order. This switching causes the chopper voltage Vbst to become higher than the power supply voltage Vin. The voltage supplied from the DC power supply to the chopper 2 is smoothed by a capacitor C2.

The controller 5 alternately turns on the switching elements SWa and SWb in a period during which the controller 5 controls the chopper 2 to generate the first part of the AC voltage waveform. Even when the power conversion apparatus 1 is in a low-load state or no-load state in a period during which the first part of the AC voltage waveform is generated, this processing enables a charge of the capacitor C1 in which the chopper voltage Vbst becomes unnecessary high to be released to the DC power supply side through the switching element SWb and the inductor L1. The switching element SWb is an example of means for forming the path through which the charge of the capacitor flows into a DC power supply.

With the power conversion apparatus 1, even when the power conversion apparatus 1 is in a low-load state or no-load state in a period during which the first part of the AC voltage waveform is generated, the generation accuracy of the AC voltage waveform can be prevented from deteriorating.

The controller 5 also controls the switching element SWb to be turned on in a period during which the controller 5 controls the inverter 3 to generate the second part of the AC voltage waveform. In this manner, the power conversion apparatus 1 can further improve the power conversion efficiency.

Specifically, the controller 5 stops the switching control on the chopper 2 and keeps the chopper voltage Vbst to the power supply voltage Vin in a period during which the inverter 3 generates the second part of the AC voltage waveform. In this case, if the switching element SWb is turned off, the power supply voltage Vin is output to the inverter 3 through the diode D2, and power loss occurs in the diode D2.

The controller 5 keeps on turning on the switching element SWb, which has power loss lower than that of the diode D2, and outputs the power supply voltage Vin to the inverter 3 through the switching element SWb in a period during which the inverter 3 generates the second part of the AC voltage waveform. This processing can further improve the power conversion efficiency in the power conversion apparatus 1 as compared with the case in which the power supply voltage Vin is output to the inverter 3 through the diode D2.

Figure 2:
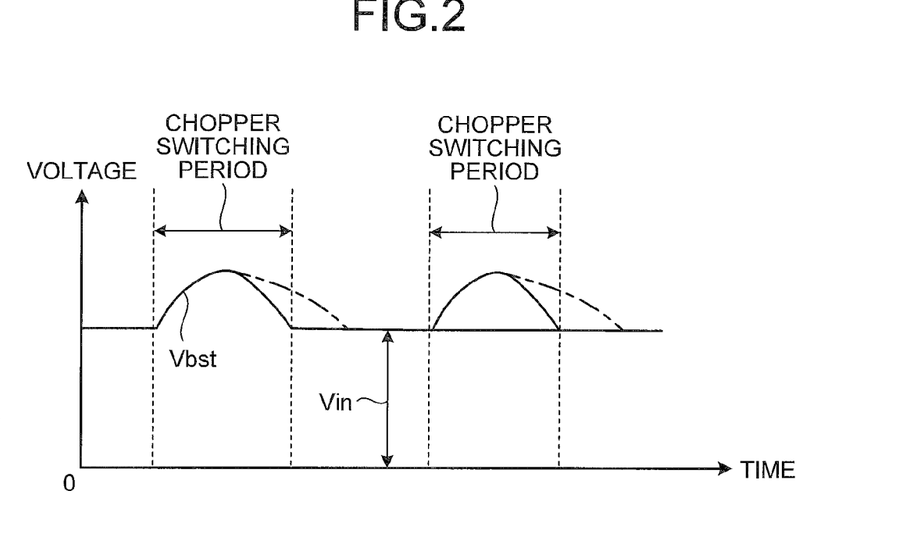
FIG. 2 is a view illustrating the waveform of a chopper voltage in accordance with the embodiment.
Figure 3:
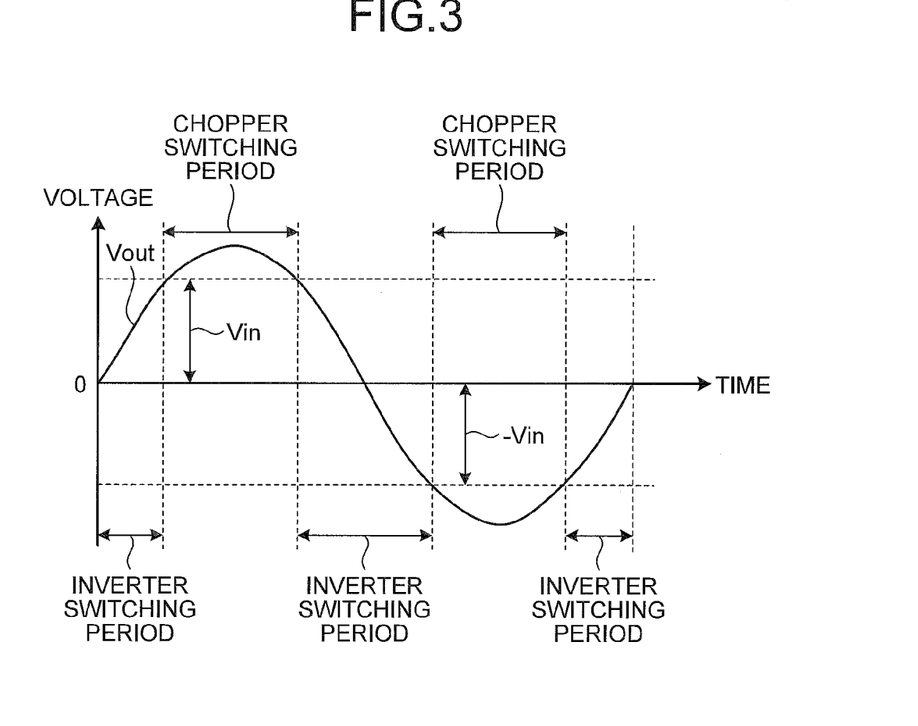
FIG. 3 is a view illustrating the waveform of an output voltage in accordance with the embodiment.
Figure 4:
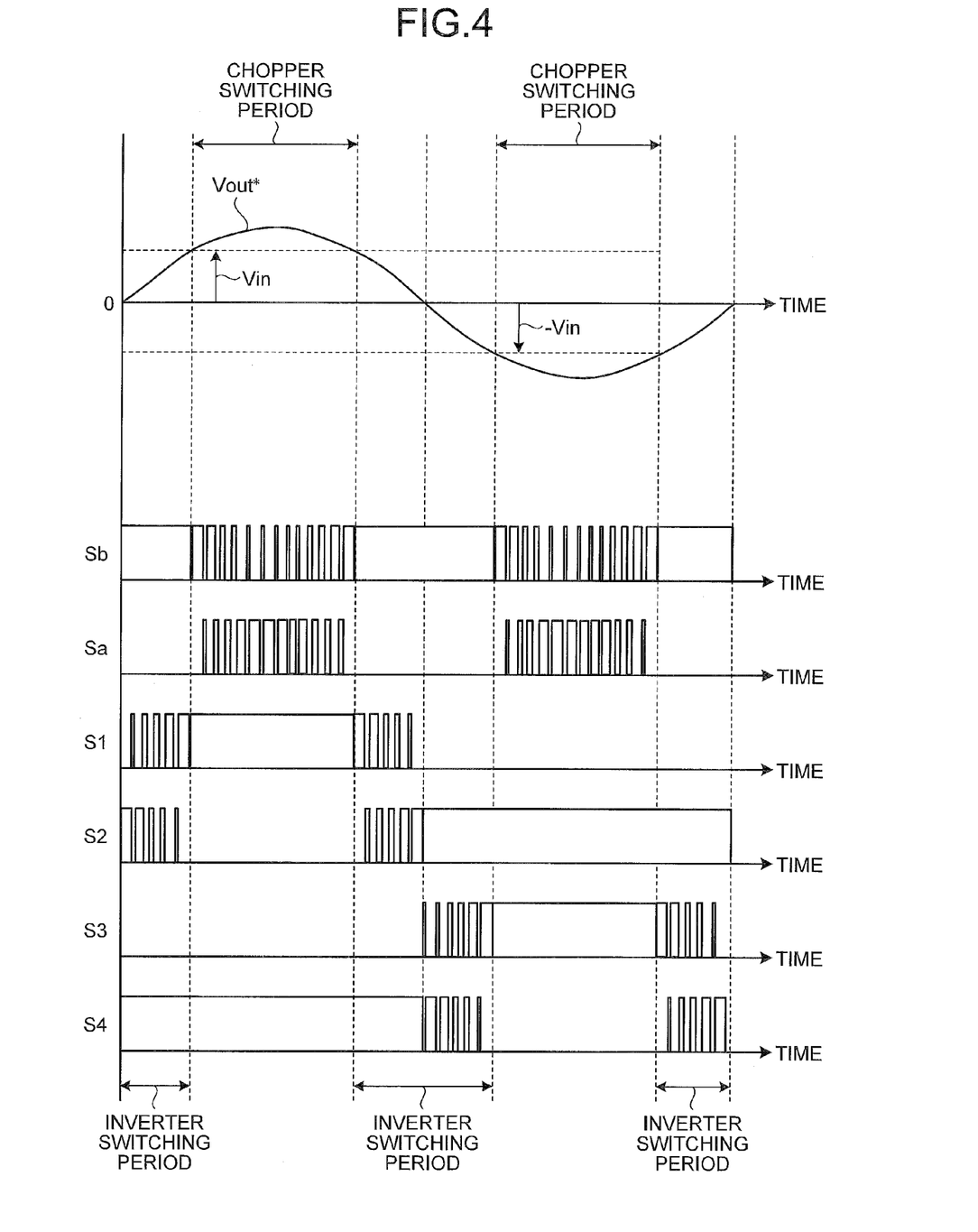
FIG. 4 is a view illustrating the normal operation performed by the power conversion apparatus in accordance with the embodiment at a normal time.

An example of the operation of the power conversion apparatus 1 is described in detail with reference to FIGS. 2 to 4. FIG. 2 is a view illustrating the waveform of the chopper voltage Vbst in accordance with the embodiment, and FIG. 3 is a view illustrating the waveform of the output voltage Vout in accordance with the embodiment. FIG. 4 is a view illustrating the normal operation performed by the power conversion apparatus 1 in accordance with the embodiment at a normal time.

Each of the chopper switching periods illustrated in FIGS. 2 to 4 is a period during which the chopper 2 generates the first part of the AC voltage waveform by alternately turning on the two switching elements SWa and SWb in the chopper 2.

Each of the inverter switching periods illustrated in FIGS. 2 to 4 is a period during which the inverter 3 is controlled to generate the second part of the AC voltage waveform by keeping the switching elements SWa off and SWb on.

A sine wave illustrated in FIG. 4 represents an output voltage reference Vout* input from the outside to the controller 5. Drive signals Sb, Sa, S1, S2, S3, and S4 illustrated in FIG. 4 are signals respectively output from the controller 5 to the switching elements SWb, Swa, SW1, SW2, SW3, and SW4 in order.

As illustrated in FIG. 4, the switching elements Swa and SWb in the chopper 2 are alternately turned on in a period during which the absolute value of the output voltage reference Vout* is higher than the power supply voltage Vin (hereinafter referred to as the "chopper switching period"). At this time, the controller 5 outputs the drive signal Sa having a duty ratio (Vout*−Vin)/Vout* to the switching element Swa.

The controller 5 keeps the switching elements SW1 and SW4 on and the switching elements SW2 and SW3 off in the chopper switching period during which a value of the output voltage reference Vout* is higher than the power supply voltage Vin. The controller 5 keeps the switching elements SW2 and SW3 on and the switching elements SW1 and SW4 off in the chopper switching period during which a positive and negative inverted value of the output voltage reference Vout* is higher than the power supply voltage Vin. Accordingly, as illustrated in FIG. 2, the waveform of the chopper voltage Vbst becomes the AC voltage waveform of a part having an absolute value higher than the power supply voltage Vin in each of the chopper switching periods.

In each of the chopper switching periods, the power conversion apparatus 1 may be in a load state having an extremely low load or no-load state. If the switching element SWb (see FIG. 1) in the chopper 2 in accordance with the embodiment is not provided in such a case, a charge stored in the capacitor C1 is not consumed by the load and the excess charge remains in the capacitor C1.

In this case, for example, as illustrated by dashed lines in FIG. 2, the chopper voltage Vbst becomes higher than a desirable AC voltage waveform along the output voltage reference Vout*, as indicated by a solid line. When the AC voltage waveform generated by the high chopper voltage Vbst like this is synthesized with the AC voltage waveform generated by the inverter 3, a level difference occurs in the synthesized part and these AC voltage waveforms are not smoothly synthesized, which reduces the accuracy of the output voltage Vout.

The power conversion apparatus 1 has the following configuration. In the configuration, the switching element SWb is provided in the chopper 2, and the switching element SWa of the chopper 2 is turned off and simultaneously the switching element SWb is turned on, in the chopper switching period. This configuration enables a charge of the capacitor C1 in which the chopper voltage Vbst becomes unnecessary high to be released to the capacitor C2 on the DC power supply side through the switching element SWb and the inductor L1 in the chopper 2 when the load becomes a low-load state or no-load state.

In this manner, the power conversion apparatus 1 can generate a desirable AC voltage waveform as indicated by a solid line in FIG. 2 in the chopper switching period. Accordingly, the power conversion apparatus 1 can improve the power conversion efficiency and accurately convert power from a DC voltage to an AC voltage.

As illustrated in FIG. 4, the controller 5 turns off the switching element SWa and turns on the switching element SWb in the chopper 2, in each of the inverter switching periods, which are periods other than the chopper switching periods.

The controller 5 applies the pulse-width-modulation (PWM) control (see FIG. 4), generally used for direct-current (DC) to alternating-current (AC) conversion, to each of the switching elements SW1, SW2, SW3, and SW4 of the inverter 3 in the inverter switching period so as to generate the second part of the AC voltage waveform. The PWM control on the inverter 3 illustrated in FIG. 4 is an example, and this is not limiting.

The power conversion apparatus 1 synthesizes the second part of the AC voltage waveform generated by the inverter 3 with the first part of the AC voltage waveform generated by the chopper 2 to generate a voltage waveform of the output voltage Vout as illustrated in FIG. 3.

In this manner, in the power conversion apparatus 1, the inverter 3 generates the second part of the AC voltage waveform in the inverter switching period while the switching control on the chopper 2 is stopped.

This processing can reduce the number of times of the switching of the chopper 2 in the power conversion apparatus 1 in accordance with the embodiment as compared with the case in which the switching of the inverter causes the whole of the AC voltage waveform to be generated while the switching is always performed in the chopper and a constant DC voltage is output from the chopper. Therefore, the power conversion apparatus 1 in accordance with the embodiment can reduce switching loss in the chopper 2. Furthermore, the power conversion apparatus 1 also reduces switching loss in the inverter 3 because the switching control on the inverter 3 is not performed during the chopper control.

The power conversion apparatus 1 turns on the switching element SWb in the chopper 2 in a period during which the inverter 3 generates the second part of the AC voltage waveform. This processing enables the power conversion apparatus 1 to output the power supply voltage Vin to the inverter 3 through the switching element SWb, rather than through the diode D2, in a period during which the second part of the AC voltage waveform is generated.

In this manner, the power conversion apparatus 1 provides the power supply voltage Vin to the inverter 3 through the switching element SWb having power loss lower than that of the diode D2 in a period during which the second part of the AC voltage waveform is generated, thereby further improving the power conversion efficiency.

Figure 5:
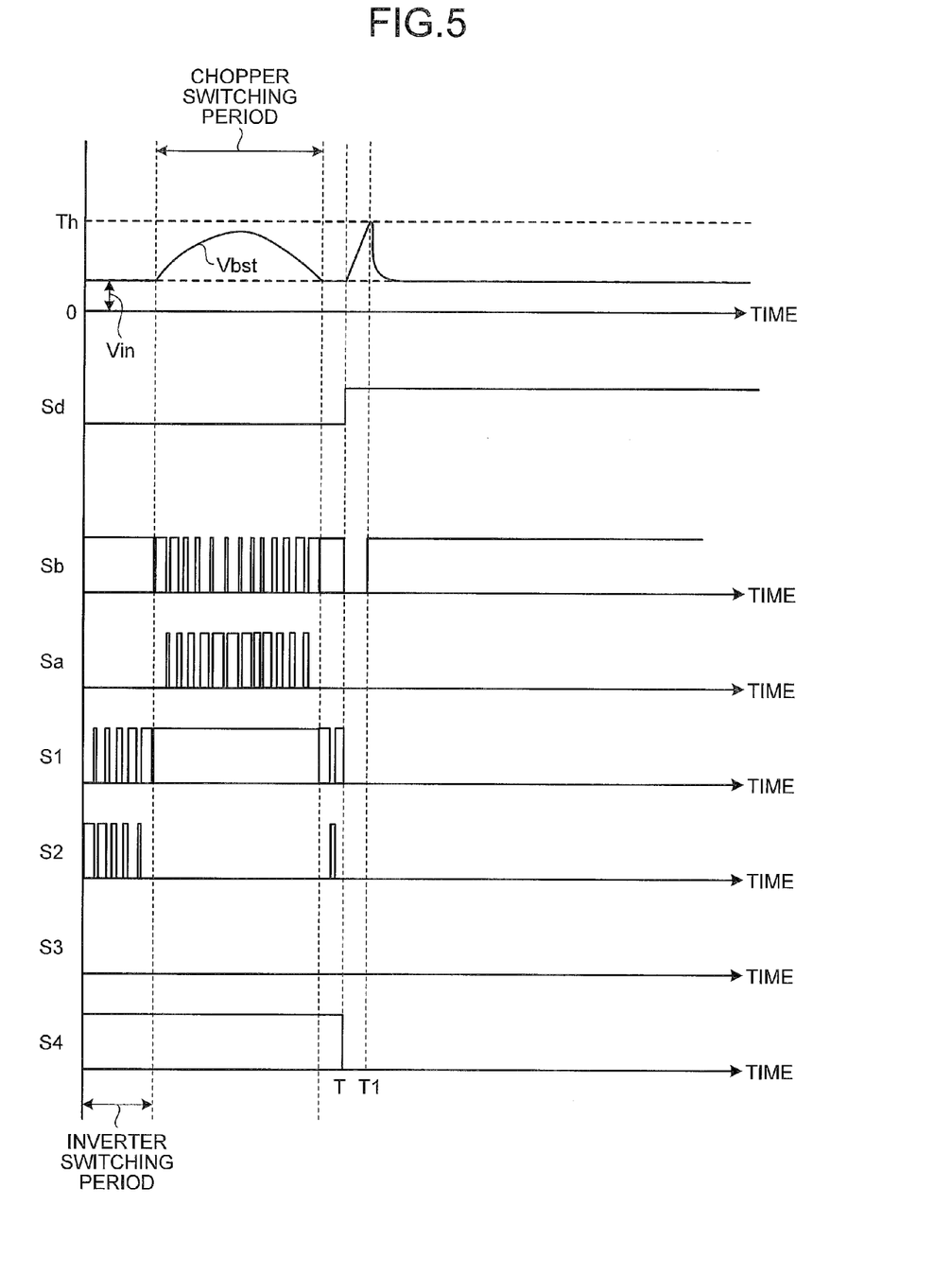
FIG. 5 is a view illustrating the emergency operation performed by the power conversion apparatus in accordance with the embodiment at an emergency time.

Referring back to FIG. 1, a description is made of other components included in the power conversion apparatus 1. A description is also made in detail below of an example of the operation performed by the power conversion apparatus 1 in association with the other components included in the power conversion apparatus 1 with reference to FIG. 5. FIG. 5 is a view illustrating the emergency operation performed by the power conversion apparatus 1 in accordance with the embodiment at an emergency time.

A current detector 6 provided to the output side of the filter 4 illustrated in FIG. 1 can detect a current value of alternating current supplied from the power conversion apparatus 1 to the load, and output the detected current value to an overcurrent detector 7. The current detector 6 is, for example, a current sensor utilizing a Hall element serving as a magnetoelectric conversion element.

The overcurrent detector 7 is a processor that compares a current value received from the current detector 6 with a predetermined threshold, and outputs a high-level overcurrent detection signal Sd to the controller 5 in a period during which the current value received from the current detector 6 exceeds the threshold.

The overcurrent detector 7 outputs a low-level overcurrent detection signal Sd to the controller 5 in a period during which a current value received from the current detector 6 does not exceed a threshold. A voltage detector 8 is a circuit element that detects and outputs a voltage value of the chopper voltage Vbst to the controller 5.

When receiving the high-level overcurrent detection signal Sd from the overcurrent detector 7, the controller 5 causes the power conversion apparatus 1 to stop supplying power to the load so as to prevent breakage of the load and the power conversion apparatus 1.

For example, as illustrated in FIG. 5, the controller 5 performs the normal operation similar to the operation illustrated in FIG. 4 in a period before the overcurrent detector 7 detects overcurrent at a time T. When the overcurrent detector 7 detects overcurrent at the time T, the controller 5 turns off all of the switching elements SWa, SWb, SW1, SW2, SW3, and SW4 so as to stop supplying the overcurrent to a motor. This processing stops the supply of overcurrent to the motor so as to prevent breakage of the motor due to the overcurrent. This processing can also prevent breakage of the inverter 3 due to the overcurrent.

In this processing, because all of the switching elements SWa, SWb, SW1, SW2, SW3, and SW4 are turned off, energy stored in the inductors L2 and L3 in the filter 4 and an inductor in the motor is input to the chopper 2 through the feedback diodes D3, D4, D5, and D6. Such energy is stored in the capacitor C1, and the chopper voltage Vbst may abnormally increase. The abnormal increase in the chopper voltage Vbst causes breakage of the power conversion apparatus 1.

When the chopper voltage Vbst reaches a predetermined threshold Th at a time T1, the controller 5 turns on the switching element SWb in the chopper 2. In this manner, the power conversion apparatus 1 can reduce the abnormally increased chopper voltage Vbst to the power supply voltage Vin so as to prevent breakage due to overcurrent.

When a unipolar device, such as a field effect transistor (FET), is used as the switching element SWb used in the power conversion apparatus 1 in accordance with the embodiment, the power supply voltage Vin can be provided to the inverter 3 through the switching element SWb, having power loss lower than that of the diode D2, in a period during which the second part of the AC voltage waveform is generated. Therefore, a larger effect on loss reduction is obtained.

In this manner, a power conversion apparatus can be provided that achieves both high power conversion efficiency and power conversion accuracy, which are important in the adaptation to an AC motor or a power conditioner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power conversion apparatus comprising:
   a chopper that includes a first switching element, an inductor, a diode, and a capacitor, and configured to store power supplied from a direct-current (DC) power supply in the capacitor sequentially through the inductor and the diode by turning on and off the first switching element;
   an inverter connected to an output of the chopper;
   a second switching element connected to the diode in reverse parallel; and
   a controller configured to control the chopper and the inverter to generate an alternating-current (AC) voltage including first and second parts of an AC voltage waveform and to cause the inverter to output the AC voltage, the chopper generating the first part having an absolute value higher than a voltage of the DC power supply and the inverter generating the second part having an absolute value lower than the voltage of the DC power supply,
   wherein the controller is configured to alternately turn on the first switching element and the second switching element in a period during which the controller controls the chopper to generate the first part of the AC voltage waveform, and
   wherein the controller is configured to turn on the second switching element when causing the inverter to stop outputting the AC voltage.

2. The power conversion apparatus according to claim 1, wherein the controller is configured to turn on the second switching element in a period during which the controller controls the inverter to generate the second part of the AC voltage waveform.

3. The power conversion apparatus according to claim 1, wherein
   the inverter includes a plurality of switching elements that are controlled by the controller to generate the second part of the AC voltage waveform, and
   the controller configured to turn on the second switching element after turning off the first switching element, the second switching element, and the plurality of switching elements of the inverter to cause the inverter to stop outputting the AC voltage.

4. The power conversion apparatus according to claim 1, wherein the controller is configured to turn on the second switching element when a voltage output from the chopper reaches a predetermined threshold after causing the inverter to stop outputting the AC voltage.

5. The power conversion apparatus according to claim 1, further comprising:
   a current detector that detects alternating current output from the inverter, wherein
   the controller is configured to cause the inverter to stop outputting the AC voltage when the alternating current output from the inverter is equal to or more than a predetermined value.

6. The power conversion apparatus according to claim 1, wherein the second switching element includes a field effect transistor (FET).

7. A power conversion apparatus comprising:
   a chopper that includes a first switching element, an inductor, a diode, and a capacitor, and configured to store power supplied from a direct-current (DC) power supply in the capacitor sequentially through the inductor and the diode by turning on and off the first switching element;
   an inverter connected to an output of the chopper;
   a second switching element connected to the diode in reverse parallel; and
   a controller configured to control the chopper and the inverter to generate an alternating-current (AC) voltage including first and second parts of an AC voltage waveform and to cause the inverter to output the AC voltage, the chopper generating the first part having an absolute value higher than a voltage of the DC power supply and the inverter generating the second part having an absolute value lower than the voltage of the DC power supply,
   wherein the controller is configured to alternately turn on the first switching element and the second switching element in a period during which the controller controls the chopper to generate the first part of the AC voltage waveform,
   wherein the controller is configured to turn on the second switching element in a period during which the controller controls the inverter to generate the second part of the AC voltage waveform, and
   wherein the controller is configured to turn on the second switching element when causing the inverter to stop outputting the AC voltage.

8. The power conversion apparatus according to claim 7, wherein
   the inverter includes a plurality of switching elements that are controlled by the controller to generate the second part of the AC voltage waveform, and
   the controller configured to turn on the second switching element after turning off the first switching element, the second switching element, and the plurality of switching elements of the inverter to cause the inverter to stop outputting the AC voltage.

9. The power conversion apparatus according to claim 7, wherein the controller is configured to turn on the second switching element when a voltage output from the chopper reaches a predetermined threshold after causing the inverter to stop outputting the AC voltage.

10. The power conversion apparatus according to claim 7, further comprising:
a current detector that detects alternating current output from the inverter, wherein
the controller is configured to cause the inverter to stop outputting the AC voltage when the alternating current output from the inverter is equal to or more than a predetermined value.

11. The power conversion apparatus according to claim 7, wherein the second switching element includes a field effect transistor (FET).

12. A power conversion method comprising:
storing power supplied from a direct-current (DC) power supply in a capacitor sequentially through an inductor and a diode by turning on and off a first switching element, a chopper including the first switching element, the inductor, the diode, and the capacitor; and
controlling the chopper and an inverter to generate an alternating-current (AC) voltage including first and second parts of an AC voltage waveform and to cause the inverter to output the AC voltage, the chopper generating the first part having an absolute value higher than a voltage of the DC power supply and the inverter generating the second part having an absolute value lower than the voltage of the DC power supply, the inverter being connected to an output of the chopper,
wherein the controller alternately turns on the first switching element and a second switching element in a period during which the controller controls the chopper to generate the first part of the AC voltage waveform, the second switching element being connected to the diode in reverse parallel, and
wherein the controller turns on the second switching element when causing the inverter to stop outputting the AC voltage.

13. A power conversion method comprising:
storing power supplied from a direct-current (DC) power supply in a capacitor sequentially through an inductor and a diode by turning on and off a first switching element, a chopper including the first switching element, the inductor, the diode, and the capacitor; and
controlling the chopper and an inverter to generate an alternating-current (AC) voltage including first and second parts of an AC voltage waveform and to cause the inverter to output the AC voltage, the chopper generating the first part having an absolute value higher than a voltage of the DC power supply and the inverter generating the second part having an absolute value lower than the voltage of the DC power supply, the inverter being connected to an output of the chopper,
wherein the controller alternately turns on the first switching element and a second switching element in a period during which the controller controls the chopper to generate the first part of the AC voltage waveform, the second switching element being connected to the diode in reverse parallel,
wherein the controller turns on the second switching element in a period during which the controller controls the inverter to generate the second part of the AC voltage waveform, and
wherein the controller turns on the second switching element when causing the inverter to stop outputting the AC voltage.

* * * * *